July 10, 1951 E. G. LINDHE 2,559,648
COATED CANDY CHEWING GUM AND METHOD OF MAKING SAME
Filed April 9, 1948 3 Sheets-Sheet 1
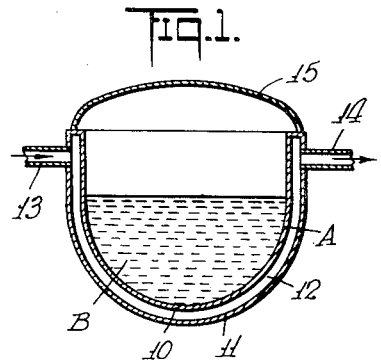
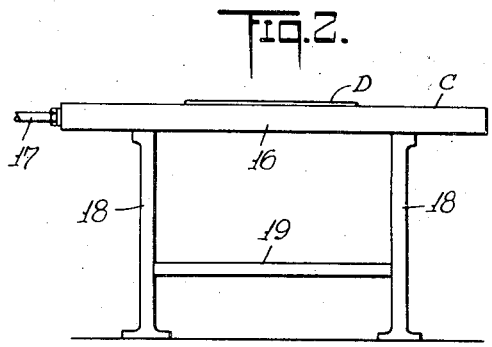
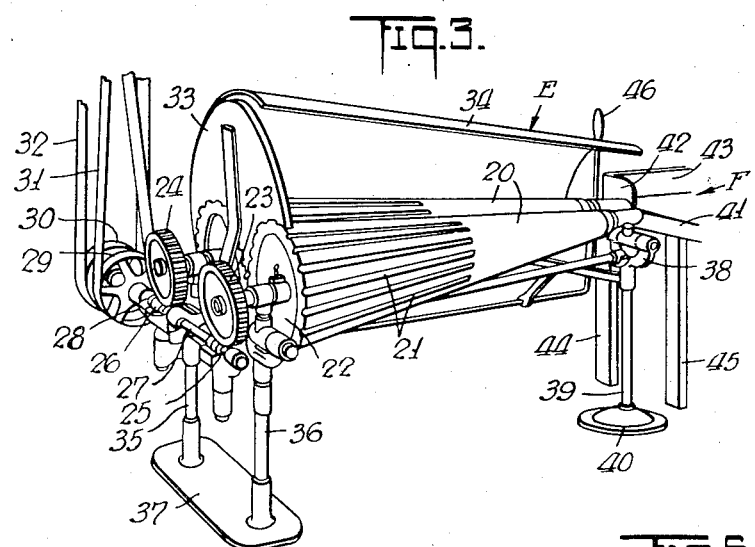
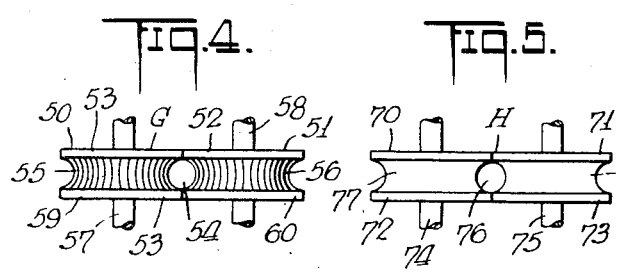
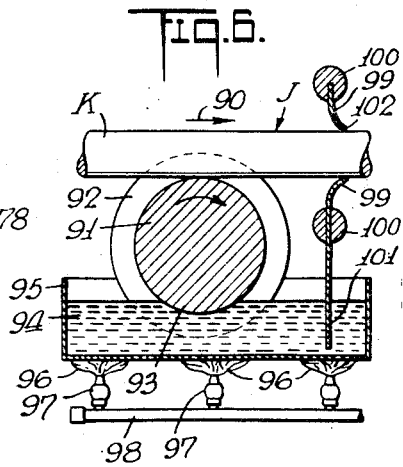
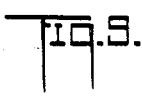
INVENTOR
Eric G. Lindhe
BY
ATTORNEY July 10, 1951        E. G. LINDHE        2,559,648
COATED CANDY CHEWING GUM AND METHOD OF MAKING SAME
Filed April 9, 1948        3 Sheets-Sheet 2
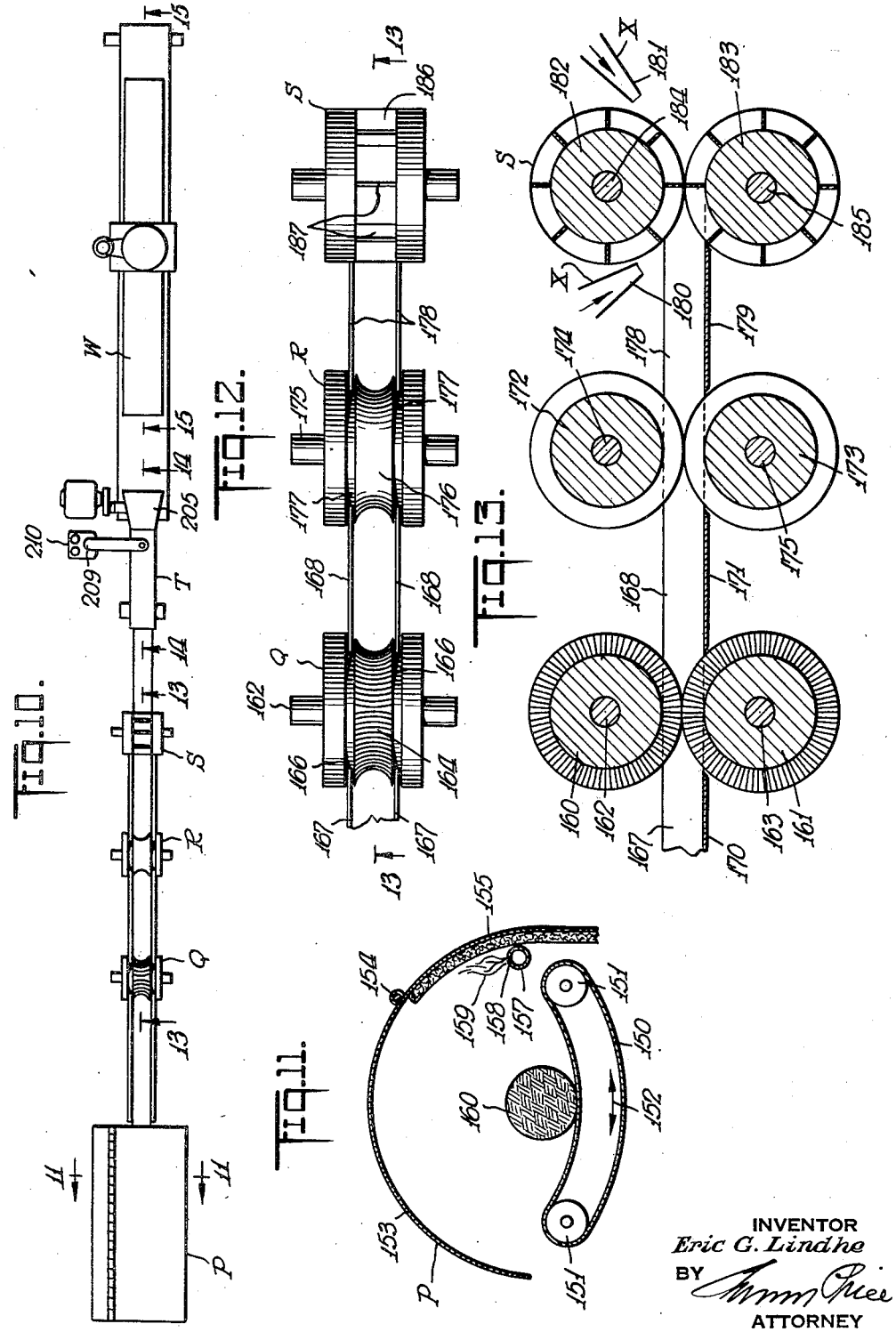
INVENTOR
*Eric G. Lindhe*
BY
ATTORNEY July 10, 1951  E. G. LINDHE  2,559,648
COATED CANDY CHEWING GUM AND METHOD OF MAKING SAME
Filed April 9, 1948  3 Sheets-Sheet 3
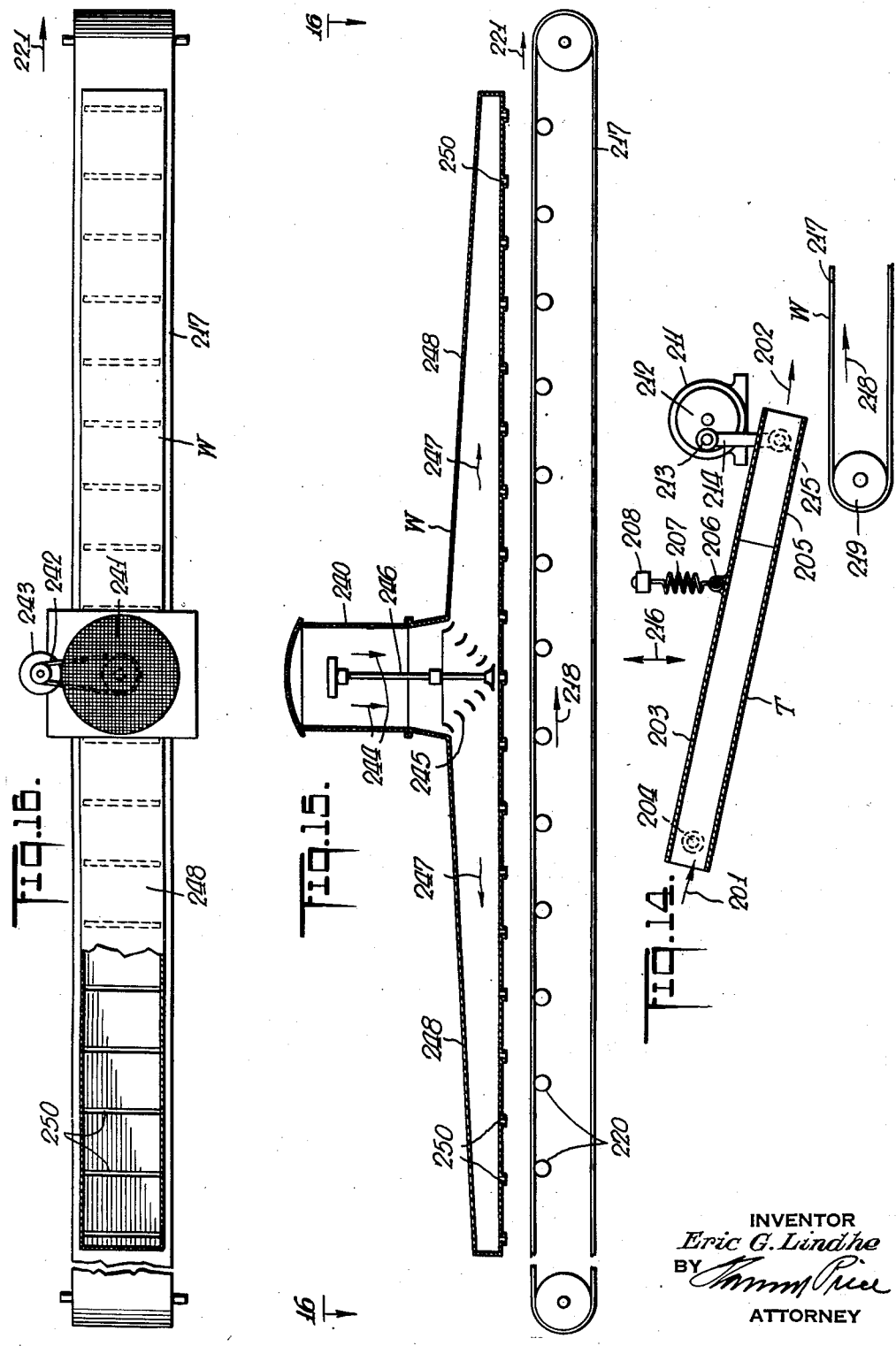
INVENTOR
Eric G. Lindhe
BY
ATTORNEY Patented July 10, 1951

2,559,648

UNITED STATES PATENT OFFICE 2,559,648

COATED CANDY CHEWING GUM AND METHOD OF MAKING SAME

Eric G. Lindhe, Hastings on Hudson, N. Y., assignor to Sweets Laboratories, Inc., New York, N. Y., a corporation of New York Application April 9, 1948, Serial No. 19,937

12 Claims. (Cl. 99—135)

The present invention relates to a novel candy chewing gum and to methods applied in, and machines useful for, making same.

It has been found that chewing gum, and particularly the gum base therein, is susceptible to oxidative deterioration and tends to lose many desirable properties upon standing and particularly upon exposure to warm or humid atmospheres. Moreover chewing gum must be made with specially designed machinery.

It is among the objects of the present invention to prepare a novel candy chewing gum confection, quite different from ordinary chewing gum or hard candy in consistency, which may be termed a candy chewing gum, and which will be remarkably stabilized against oxidative and atmospheric deterioration.

A further object of the present invention is to prepare a candy chewing gum which can be made in any shape, flavor and color and by relatively inexpensive and simple procedures and machinery now used in the manufacture of hard candy, which is not possible with ordinary chewing gum.

A still further object of the present invention is to prepare a candy chewing gum which, due to the density of the confection itself in its combination with the gum base, will maintain its flavor goodness over a longer period than can be obtained in ordinary chewing gum.

A still further object of the present invention is to make possible a far less expensive method of production of a novel chewing gum product, so far as both machinery and labor are concerned, than is involved in the manufacture of ordinary chewing gum.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In making ordinary chewing gum, it is the practice to melt the base and then to mix in the sugar. This method introduces a certain amount of oxygen directly into the gum base, thereby promoting oxidative and atmospheric deterioration. It has now been found in making candy chewing gum that by mixing gum base with boiled sugar or candy in its hot liquid state, oxygen is eliminated and a perfect insulation established. This protects against the rapid deterioration so marked in ordinary chewing gum, with consequent loss of flavor, and will also preserve the chewing qualities of the gum base itself.

To make candy chewing gum, the sugar, lactose, fructose, glucose or dextrose molasses, invert sugar, or other sugar material is combined with the gum base in the cooking process at a temperature of from 23° F. to 260° F.

Desirably, the sugar and glucose syrups, in proportions of 2 to 5 parts of sugar to each part of glucose, are cooked until semi-solid or plastic, when all moisture is removed. The cooking temperature is gradually increased as the moisture is removed, for example over a period of twenty minutes. The cooking may be carried out at a temperature ranging up to 350° F. and desirably to 320 to 340° F. In vacuum pans this cooking temperature is proportionately lowered corresponding to the inches of vacuum carried in the cooker. Flavoring material is added after the cooking and the mixture of cooked sugar and gum base at a temperature of about 150° F.

The gum base may contain combinations of natural and synthetic chicles and resins and may also contain a hydrogenated oil.

To give specific examples as to the proportions employed:

Example I

| | Per cent by weight |
|---|---|
| Gum base | 20 to 25 |
| Cane sugar | 70 to 60 |
| Glucose | 10 to 15 |

Example II

| | Parts by weight |
|---|---|
| Gum base | 3 |
| Cane sugar | 6 |
| Glucose | 1 |

(plus about 1% flavoring material by weight)

Example III

| | Parts by weight |
|---|---|
| Gum base | 2 |
| Cane sugar | 7 |
| Glucose | 1 |

(plus about 1% flavoring material by weight)

Example IV

| | Per cent by weight |
|---|---|
| Gum base | 20 |
| Invert sugar | 60 |
| Glucose | 20 |

(plus about 1% flavoring material by weight)

After the cooking, the mixture of dehydrated gum base and sugar may be placed upon a warming table to permit its temperature to fall down to 200° F. to 135° F.

Then it may be spun by a batch spinner to get a rod ¾" in thickness, passed through corrugated and smooth sizing rolls, coated with a mixture of wax and hydrogenated oil and cut to pillow-shaped pieces ½" wide by ½" long by 1/16" in thickness.

The desired coating should be applied in 0.001 to 0.002 inch in thickness at a temperature of 130° F. to 135° F. to the cooled mixture of chewing gum and sugar in rod form. The coating material may consist of a molten mixture of 5 to 20% of a wax such as candelilla wax or carnauba wax and 80 to 95% of a hard hydrogenated oil, such as hydrogenated coconut oil or hydrogenated peanut oil.

The molten wax-hydrogenated oil coating may be applied to other types of candy, but it is most desirably applied to candy chewing gum, as a stabilizer of the flavor and other organic constituents therein against deterioration by atmospheric oxygen and moisture. With oil of peppermint, for example, the flavor is preserved during storage and it therefore will be present for a prolonged chewing period.

The hydrogenated oil-wax mixture when applied in molten condition at 135 to 140° F. appears to leave a waxy outside coating with an inner coating of the hydrogenated oil being absorbed or absorbed into the candy chewing gum base.

This composition and absorption of the wax-oil coating assures that the coating will not split or flake off during flattening of the candy chewing gum bar and cutting thereof into pieces.

After the compound is made, the material appears to be a candy of superior density which will retain its taste and flavor over considerable periods of time without deterioration.

The invention also consists in certain new and original features in composition and procedures and of construction and combination of parts, hereinafter set forth and claimed and as to its other objects, features and advantages, the mode of operation and manner of its organization, these may be better understood by referring to the following description considered in connection with the accompanying drawings forming a part thereof in which:

Fig. 1 is a side sectional view diagrammatically illustrating the construction of the steel jacketed kettle for cooking the sugar-gum base mixture.

Fig. 2 is a side elevational view diagrammatically illustrating the construction of a jacketed cooling table.

Fig. 3 is a side perspective view diagrammatically illustrating one type of batch spinning machine.

Figs. 4 and 5 are respectively diagrammatic end views of pairs of corrugated and smooth sizing rolls.

Fig. 6 is a side view illustrating the coating device.

Figs. 7, 8 and 9 are respectively transverse sectional views illustrating the cross sectional shape and form of the bar of candy chewing gum in various stages of manufacture.

Fig. 10 is a top diagrammatic plan view of an alternative layout for processing the candy chewing gum composition from the cooking stage up to and including the final tabletting.

Fig. 11 is a transverse sectional view upon the line 11—11 of Fig. 10 of the batch roller construction used upon an enlarged scale as compared to Fig. 10.

Fig. 12 is a fragmentary top plan view of a portion of the mechanism of Fig. 10, showing the forming, sizing and tabletting rolls upon an enlarged scale as compared to Fig. 10.

Fig. 13 is a side sectional view of the forming, sizing and tabletting rolls upon the line 13—13 of Figs. 10 and 12 upon an enlarged scale as compared to Fig. 10.

Fig. 14 is a vertical transverse sectional view upon the line 14—14 of Fig. 10 upon an enlarged scale as compared to Fig. 10, showing the tablet separating vibrator device.

Fig. 15 is a transverse vertical sectional view upon the line 15—15 of Fig. 10 of the cooling conveyor belt upon an enlarged scale as compared to Fig. 10.

Fig. 16 is a top plan view of the cooling conveyor belt at the right side of Fig. 10 and taken upon the line 16—16 of Fig. 15, said belt being shown upon an enlarged scale as compared to Fig. 10.

Referring to Fig. 1 there is shown a kettle A having an inner structure 10 receiving the molten gum base-sugar mixture B and an outer shell 11 with an intervening steam jacket 12. The steam is fed into and may be removed from the steam jacket 12 by the connections 13 and 14. Where vacuum is applied the kettle A is provided with a cover 15.

In the kettle A the mixture of cane sugar and invert sugar is elevated up to a temperature of 310° F. to 330° F. until the moisture is reduced down to below 5 to 10%, and preferably below 1%. This operation usually takes about twenty to thirty minutes. The temperature at no time should exceed 340° F.

After this cooking operation, the temperature is permitted to drop to 290° F. and the molten or finely divided gum base is added. Then the molten batch of mixed gum base and sugar is dumped out on to the candy cooling table C and formed into a slab D.

The table C is provided with the jacket 16 having the inlet 17 for the cooling or heating fluid. The table C is supported upon the legs 18 having a cross brace 19. After the temperature has been reduced on the warming table C to about 140° F. to 150° F., the flavoring oil is added. Then the candy is placed in the batch spinner E.

The batch spinner E has the conical spinning rollers 20 provided with the grooves 21 adjacent their larger ends 22. The spinning rollers are driven through the gears 23 and 24 by the worms 25 and 26 respectively. The worm 25 is driven by the center shaft 27 while the worm 26 is driven by the sleeve shaft 28. The shafts 27 and 28 are driven respectively by the pulleys 29 and 30 and the belts 31 and 32.

The device is provided with a back board 33 having the cover or shield 34 and is supported by the legs 35 and 36 upon the floor piece 37. The narrow or small ends of the rollers 20 are supported by the yoke structure 38, the standard 39 and the floor piece 40.

The conical members 20 feed the candy chewing gum in rod form K (see Fig. 7) onto the table F having the board portion 41, the side walls 42 and 43 and the legs 44 and 45. The lever 46 enables control of the operation of the machine of Fig. 3.

In this machine E the batch D is drawn into a rod K about ¾" in thickness and deposited upon the table F. Then the rod K of the cooked and cooled combination of sugar and gum base is passed between the corrugated rollers G and the smooth sizing rollers H. The rollers G consist of two rollers 50 and 51 having the contacting edge portions 52 and 53 and 59 and 60 and a center opening 54 through which the rod is passed. The rollers have the corrugated recesses 55 and 56. The wheels are driven by the shafts 57 and 58.

The smooth wheels 70 and 71 have smooth contacting edges 72 and 73 and are driven on the shafts 74 and 75.

The opening 76 between the wheels 70 and 71 receives the rod of cooked and cooled sugar and gum base. The curved surfaces 77 and 78 contact the candy and gum base rod and smooth it to proper size.

In Fig. 6 is shown the wax and oil coating machine J through which the rod K as indicated in Fig. 7 passes. The rod K passes in the direction 90 over the coating roller 91 having the curved coating face 92. The lower portion of the roller 91 dips into the bath 94 of the coating material.

The coating material 94 is received in the pan 95 which is heated to 130° F. to 135° F. by the burners 96 fed from the gas or oil jets 97 and the pipe 98. After the rod K contacts the coating roller 91 it will pass between the rubber or felt wiper blades 99 supported by the ring 100 to cause a uniform coating of wax and oil and to wipe off any excess coating material.

The excess coating solution will be conducted back to the pan 95 by the drip sheet 101. The wiper 99 has an opening 102 somewhat smaller than the rod K.

As indicated in Fig. 7, the rod K before the apparatus J will be uncoated. Then as shown in Fig. 8 it will receive a waxy coating 103. Finally as shown in Fig. 9 it will be flattened as indicated at L with the waxy coating 103 completely covering the same without cracking or scaling off. Even when cut into pieces the cut pieces will be completely coated with the coating 103.

The candy chewing gum produced according to this invention has the external appearance of a smooth glistening boiled candy or sweet and it is homogeneous throughout and in this appearance and homogeneity it differs substantially from chewing gum, either of the sugar coated or uncoated variety. It appears to be a homogeneous emulsion of gum base in sugar with much finer subdivision, approaching colloidal size, as contrasted to normal chewing gum. The cooked candy or sugar encompasses and encloses the finely dispersed gum base particles and it is not possible to distinguish them in cross section. The final product may be brittle or non-brittle, but it is relatively breakable as compared to bendable and flexible chewing gum. It is devoid of flakes or grains of sugar. It tastes and has mouth effect of candy when initially placed therein.

The starting sugar material may be a cane sugar syrup (50% to 60% sugar), a glucose syrup (say 57% sugar), an invert sugar syrup (say 50% to 60% sugar) and before combination with the gum base the moisture is reduced to less than 10%, or, preferably, less than 5%, or even less than 1%, by cooking or boiling in the atmosphere up to 300° F. to 330° F. or in a vacuum pan up to 200° F. to 260° F. The gum base may be melted at a temperature of 250° F. to 260° F. or above and may be added with vigorous agitation to the still molten hot sugar syrup. Preferably, the gum base may be allowed to melt into the syrup. Contrarily, if desired, the molten hot sugar may be added to the heated gum base.

The gum base should not be held at a temperature which will interfere with its chewing properties. For example, the molten gum base should, at no time, reach a temperature in excess of 300° F. before or during mixture with the boiled sugar.

Then the flavoring is added after the temperature of the mixture has dropped to about 150° F. The flavoring may be oil of peppermint, cloves, wintergreen, cinnamon, wild cherry, lime or other suitable flavors. The mixing may be carried out in a baker's mixer, copper stirring kettles, in a revolving drum or in other suitable equipment. Essentially, a hot liquidized gum base is combined with a hot liquidized dehydrated sugar material in such equipment.

If desired, cream of tartar may be added in small quantities to give the material a better pull and tenacity during manufacture and a brittle consistency in the finished product.

For example, 25 to 50 grams of cream of tartar may be used per pound of sugar. Apparently the cream of tartar makes the product tougher and more pullable in its heated state and more brittle after cooking.

It is also desirable in many instances to include small amounts of corn starch, say up to 1 to 5%.

In extrusion of the final candy chewing gum, it has been found best to maintain the mixture at a temperature of 130° F. to 150° F. The final material may be extruded in various cross sectional shapes, such as circular, oval, half round, annular, square, hexagon and so forth, and then cut into lengths.

In the embodiment of Figs. 10 to 16, the mixture of sugar, gum base and other ingredients has been made as already described in connection with Figs. 1 and 2. This composition in the form of a rod, cylinder or rope is placed in the batch roller P from which it passes to the first corrugated sizing or feeding rollers Q, the final sizing or smoothing rollers R and the tabletting rollers S. From the tabletting rollers S it passes through the vibrator T, where the tablets are broken apart, and then it passes onto the cooling conveyor belt arrangement W.

To give a specific embodiment, a mixture of granulated sugar in the amount of 10 parts by weight, invert sugar in the amount of 2½ parts by weight, and cream of tartar in the amount of 1/20 part by weight are cooked in a vessel such as B in Fig. 1 for 20 minutes up to a temperature of 320° F. and then permitted to cool to 290° F. Then about ½ part of hydrogenated oil and about 1/10 part of baking soda are added while the molten sugar mixture is maintained at 290° F. In the meanwhile the gum base has been melted by heating to a temperature of 250° F., and this gum base is then stirred into the molten sugar mixture. The mass is then poured out upon a cooling table such as indicated at C in Fig. 2, and flavoring oil or substances are added at a temperature of about 170° F.

Then the batch is placed upon the batch roller P of Figs. 10 and 11. The batch at this time has approximately the following composition in parts by weight:

| Ingredients | Preferred | Range |
| --- | --- | --- |
| Granulated sugar | 10 | 5-15 |
| Invert sugar | 2½ | 1-5 |
| Gum base | 3 | 1-7 |
| Cream of tartar | 1/20 | 1/100-1/10 |
| Hydrogenated oil | ½ | ¼-¾ |
| Baking soda | 1/10 | 1/20-½ |
| Water | 3 | 1-5 |

The composition should be devoid of cold flow at summer temperatures. The cream of tartar will keep the composition from graining, while the baking soda will make the composition crunchy and give it hard candy characteristics. The sugar composition, which may include dextrose in lieu of part or all of the invert sugar, should have been cooked until substantially all of the water has been driven therefrom or until the water is reduced to below 5% and preferably below 1 to 2%. Then it should have been cooled before inclusion of the gum base therein, which gum base is a mixture of suitable rubbers, synthetic and natural, resins and plasticizers.

From the cooling table of Fig. 2, after the flavoring has been added at a sufficiently low temperature of about 160 to 180° F., the roll of material or batch is dumped upon the canvas belt or web 150 of the batch roller P (see Figs. 10 and 11). The belt 150 is rotated by the rollers 151 in one direction or in both directions as indicated by the arrows 152. The batch roller P has a cover 153 hinged at 154 to the side plate 155. Inside the side plate 155 is asbestos lining 156. Along the lining 156 extends a gas conduit or tube 157 having a plurality of openings 158 from which issue the flames 159. These flames will keep the batch of material 160 at a temperature of 125° to 150° F. while it is being rolled for a period of time varying from about 15 to 60 minutes and until it achieves the proper consistency, plasticity, diameter and size.

The material 160 then is passed through the first sizing roller Q, the second sizing roller R and the tabletting roller S, where it may be subjected to a cooling effect by the streams of air X. As shown the upper and lower rough sizing rollers 160 and 161 are driven on the shafts 162 and 163 and have a central corrugated rough sizing groove portion 164 which will round and roughly size the candy chewing gum composition as indicated at K in Fig. 7. The sides of the rollers 160 and 161 have deep grooves 166 into which project the guide walls 167 and 168. These walls are mounted upon the tables 170 and 171 and project upwardly to guide the composition 160 in its movement through the rolls. After the material 160 leaves the preliminary sizing rolls Q it passes through the smooth sizing rolls R.

The smooth sizing rolls R (see Figs. 10, 12 and 13) include an upper roller 172 and a lower roller 173 driven on the shafts 174 and 175. The rolls 172 and 173 have a central smooth semi circular groove 176 through which the composition 160 passes. The rolls 172 and 173 also have deep grooves 177 into which project the guide walls 168 and 178. The guide walls 178 project upwardly from the floor or tray 179 (see Fig. 13). If desired, at this stage the sized rod of combined gum base and sugar with other ingredients may be cooled by a jet of air indicated at X to chill it and render it brittle or crunchy, which stream of air may be applied only at the exit side as indicated at 181 or at both the inlet and exit sides as indicated at 180 and 181. The cooling air B should be applied just as the material passes through the tabletting or dividing rollers S.

The dividing rollers S include two rollers 182 and 183 driven by the shafts 184 and 185. The middle portion of the rollers 182 and 183 have a relatively flat groove 186 with a plurality of partitions 187 which tablet the rod of material 160.

The tabletted rod then passes into the vibrator or shaker T.

The strip of material will enter the vibrator T as shown in Fig. 14 as indicated by the arrow 201 in a continuous strip formed into tablets, and it will leave as indicated by the arrow 202 as separated candy gum tablets. The vibrator T consists of a flat tube 203 of approximately rectangular cross-section pivotally mounted at 204 and having an expanding mouth 205 (see Fig. 10). The top of the tube 203 has an ear 206 attached to the coil spring 207, which is connected at its upper end to the horizontal arm 208 of the vertical post 209 mounted on the base 210. The motor 211 drives an eccentric disk 212 to which the air 214 is connected at the pivot 213. The arm 214 is pivotally connected at 215 to the tube 203. The tube 203 will thus be violently oscillated upwardly and downwardly as indicated by the arrows 216 to break apart the tablets.

The tablets will then fall upon the wire mesh belt 217 of the cooling apparatus W which is driven in the direction 218 by the rollers 219.

As indicated in Figs. 15 and 16, the belt has a series of supporting and guide rollers 220 which carry the separated tablets of chewing gum to the finish end 221 indicated in Figs. 15 and 16. While passing on the belt in the direction 218, the tablets are exposed to a stream of air which will result in thoroughly cooling the tablets and at the same time causing a fracture through the mass thereof, giving distinctive crunchy chewing characteristics.

The cooling device has a tower 240 in which is the blower 241 driven by a belt 242 from the motor 243. From the tower the air is forced down as indicated by the arrows 244 through the directing louvres 245, which may be adjusted in direction and spacing by the central rod 246. The air then passes outwardly as indicated by the arrows 247 into the forward and rearward extensions 248 and then out through the spaced adjustable restricted slots 250 which extend transversely across the carrier belt. This cooling effect, in combination with that which takes place at the cool air blower X at positions 180 and 181 in Fig. 13, will assure a proper crunchiness and consistency of the chewing gum.

As an alternative procedure, gum base and sugar, preferably sucrose or sucrose and anhydrous glucose, are ground together at a temperature so low, say below 32° F. and between 20° F. and 10° F., at which the gum base is brittle and subject to grinding. The finely powdered mixture including flavor then may be compressed into chewing gum tablets or bars or extruded into rods and these tablets, bars or rods then coated with a molten wax and oil mixture.

It is also possible to coat ordinary chewing gum with the wax and oil mixture and most satisfactory results are obtained where the gum base of the candy gum or ordinary chewing gum contains 5 to 15% of hydrogenated oil since then the oil in the coating will penetrate into the gum base in the chewing gum or candy gum.

The present application is a continuation-in-part of application Ser. No. 652,798 filed March 7, 1946, which matured into Patent No. 2,460,698 on February 1, 1949.

In the above procedure, it is often desirable to add part of the sugar to the gum base before it is incorporated with the dehydrated sugar materials. For example, from 5 to 20% of the gum base may consist of sugar, preferably in dehydrated, boiled condition, or in normal condition before dehydration. This addition of sugar to the base, which may contain various synthetic and natural rubbers, as well as hydrogenated rosin and various latices, is quite advantageous in preventing cold flow.

As many changes could be made in the above candy chewing gum compositions and method of making the same, and many widely different embodiments of this invention could be made without departing from the scope of the claims, it is intended that all matter contained in the above description shall be interpreted as illustrative and not in a limiting sense.

Having now particularly ascertained the nature of the invention, and in what manner the same is to be performed, what is claimed is:

1. A homogeneous wax and oil coated candy chewing gum, devoid of sugar flakes and crystals, having superior oxidative and atmospheric resistance, having the appearance of candy and being chewable to a firm cud, comprising a combination of gum base and boiled sugar, the gum base being encompassed in the form of a fine dispersion in the sugar, said chewing gum having a uniform homogeneous hard candy-like appearance throughout its interior inside of its surface and having a tendency to crunch and fracture like hard candy and consisting of a uniform homogeneous dispersion of substantially dehydrated sugar as an exterior face and the chewing gum base dispersed therethrough as an interior face and said wax and oil coating maintaining the dehydrated condition of the chewing gum.

2. A homogeneous wax and oil coated candy chewing gum, devoid of sugar flakes and crystals, having superior oxidative and atmospheric resistance, having the appearance of candy and being chewable to a firm cud, comprising a combination of gum base, boiled glucose and boiled sugar, the gum base being encompassed in the form of a fine dispersion in the sugar, said chewing gum having a uniform homogeneous hard candy-like appearance throughout its interior inside of its surface and having a tendency to crunch and fracture like hard candy and consisting of a uniform homogeneous dispersion of substantially dehydrated sugar as an exterior face and the chewing gum base dispersed therethrough as an interior face and said wax and oil coating maintaining the dehydrated condition of the chewing gum.

3. A method of making a homogeneous candy chewing gum, devoid of sugar flakes and crystals, having superior oxidative and atmospheric resistance, having the appearance of candy and beeing chewable to a firm cud, which comprises mixing a dehydrated molten sugar with a hot gum base, then cooling, and forming the mixture of sugar and gum base, and then coating the formed cooled dehydrated mixture of gum base and sugar with a molten mixture of wax and hydrogenated oil, the gum base being encompassed in the form of a fine dispersion in the sugar, said chewing gum having a uniform homogeneous hard candy-like appearance throughout its interior inside of its surface and having a tendency to crunch and fracture like hard candy and consisting of a uniform homogeneous dispersion of substantially dehydrated sugar as an exterior face and the chewing gum base dispersed therethrough as an interior face and said wax and oil coating maintaining the dehydrated condition of the chewing gum.

4. A method of making a homogeneous candy chewing gum having a wax and oil coating and being, devoid of sugar flakes and crystals, having a superior oxidative and atmospheric resistance, having the appearance of candy and being chewable to a firm cud, which comprises cooking sugar at a temperature up to about 320° F. and then cooling to about 290° F., mixing a molten gum base therewith, cooling and forming the mixture of sugar and gum base into a rod, tabletting the rod, and then quickly cooling the tablets, the gum base being encompassed in the form of a fine dispersion in the sugar, said chewing gum having a uniform homogeneous hard candy-like appearance throughout its interior inside of its surface and having a tendency to crunch and fracture like hard candy and consisting of a uniform homogeneous dispersion of substantially dehydrated sugar as an exterior face and the chewing gum base dispersed therethrough as an interior face and said wax and oil coating maintaining the dehydrated condition of the chewing gum.

5. A method of making a homogeneous candy chewing gum having a wax and oil coating and being, devoid of sugar flakes and crystals, having superior oxidative and atmospheric resistance, having the appearance of candy and being chewable to a firm cud, which comprises mixing molten dehydrated sugar and gum base at an elevated temperature, adding a flavoring material at a lowered temperature, cooling and forming the mixture of sugar and gum base into tablets, and then blowing the tablets with cooling air, the gum base being encompassed in the form of a fine dispersion in the sugar, said chewing gum having a uniform homogeneous hard candy-like appearance throughout its interior inside of its surface and having a tendency to crunch and fracture like hard candy and consisting of a uniform homogeneous dispersion of substantially dehydrated sugar as an exterior face and the chewing gum base dispersed therethrough as an interior face and said wax and oil coating maintaining the dehydrated condition of the chewing gum.

6. A method of making a candy chewing gum, devoid of sugar flakes and crystals, having superior oxidative and atmospheric resistance, having the appearance of candy and being chewable to a firm cud, which comprises cooking a mixture of a sugar syrup and invert sugar until substantially all moisture has been eliminated, adding a molten gum base thereto, cooling and forming the mixture of sugar and gum base, and then coating the formed cooled cooked mixture of gum base and sugar with a molten mixture of wax and hydrogenated oil, the gum base being encompassed in the form of a fine dispersion in the sugar.

7. A method of making a candy chewing gum, devoid of sugar flakes and crystals, having superior ovidative and atmospheric resistance, having the appearance of candy and being chewable to a firm cud, which comprises cooking molten sugar and invert sugar at an elevated temperature up to about 320° F. and then cooling to about 290° F., mixing a molten gum base therewith, adding a flavoring material at a lowered temperature of about 150° F., cooling and forming the mixture of sugar and gum base, and then coating the formed, cooled, dehydrated mixture of gum base and sugar with a molten mixture of wax and hydrogenated oil, the gum base being encompassed in the form of a fine dispersion in the sugar, said chewing gum having a uniform homogeneous hard candy-like appearance throughout its interior inside of its surface and having a tendency to crunch and fracture like hard candy and consisting of a uniform homogeneous dispersion of substantially dehydrated sugar as an exterior face and the chewing gum base dispersed therethrough as an interior face and said wax and oil coating maintaining the dehydrated condition of the chewing gum.

8. A method of making a candy chewing gum having a wax and oil coating and being devoid of sugar flakes and crystals, having superior oxidative and atmospheric resistance, having the appearance of candy and being chewable to a firm cud, which comprises cooking a sugar syrup up to 320° F. and then cooling it to 260° F. to 290° F., melting the gum base, mixing the molten gum base in the hot dehydrated sugar syrup, cooling and forming the mixture of sugar and gum base, and then quickly chilling the formed mixture, said chewing gum having a uniform homogeneous hard candy-like appearance throughout its interior inside of its surface and having a tendency to crunch and fracture like hard candy and consisting of a uniform homogeneous dispersion of substantially dehydrated sugar as an exterior face and the chewing gum base dispersed therethrough as an interior face and said wax and oil coating maintaining the dehydrated condition of the chewing gum.

9. A method of making a candy chewing gum having a wax and oil coating and being devoid of sugar flakes and crystals, having superior oxidative and atmospheric resistance, having the appearance of candy and being chewable to a firm cud, which comprises cooking a sugar syrup up to 300° F. to 330° F. to dehydrate the same, melting the gum base at above 200° F., mixing the gum base in the hot dehydrated sugar syrup, lowering the temperature to about 150° F., and adding a flavoring material, cooling and forming the mixture of sugar and gum base into a rod, and tabletting the rod, said chewing gum having a uniform homogeneous hard candy-like appearance throughout its interior inside of its surface and having a tendency to crunch and fracture like hard candy and consisting of a uniform homogeneous dispersion of substantially dehydrated sugar as an exterior face and the chewing gum base dispersed therethrough as an interior face and said wax and oil coating maintaining the dehydrated condition of the chewing gum.

10. A process of making a hard candy-like chewing gum having a uniform homogeneous hard candy-like appearance throughout its interior comprising cooking sugar and glucose syrups up to 310 to 340° F. to reduce the moisture to below 1%, permitting the temperature to drop to below 290° F., adding a molten gum base, cooling the mixture to 140° F. to 150° F. and adding a flavoring oil forming a rod of the mixture and then wiping a coating of wax and hydrogenated oil onto said rod and finally tabletting.

11. The process of claim 10 in which the coated chewing gum is quickly cooled by a blast of air during tabletting.

12. The process of claim 10 in which after tabletting the chewing gum is slowly cooled for a prolonged period by blasts of air.

ERIC G. LINDHE.

REFERENCES CITED

The following references are of record in the file of this patent:

UNITED STATES PATENTS

| Number | Name | Date |
|---|---|---|
| 280,115 | Aubin | June 26, 1883 |
| 1,407,400 | Ferrari | Feb. 21, 1922 |
| 1,587,414 | Pond | June 1, 1926 |
| 1,771,981 | Mustin | July 29, 1930 |